(12) United States Patent
Pedretti-Rodi et al.

(10) Patent No.: US 10,450,953 B2
(45) Date of Patent: Oct. 22, 2019

(54) PRESSURISED ENERGY STORAGE SYSTEM IN WHICH THE HEAT ACCUMULATOR IS ARRANGED IN AN OVERPRESSURE ZONE

(71) Applicant: Airlight Energy IP SA, Biasca (CH)

(72) Inventors: Andrea Pedretti-Rodi, Bellinzona (CH); Giw Zanganeh, Viganello (CH)

(73) Assignee: Airlight Energy IP SA, Biasca (CH)

( * ) Notice: Subject to any disclaimer, the term of this patent is extended or adjusted under 35 U.S.C. 154(b) by 6 days.

(21) Appl. No.: 14/382,486

(22) PCT Filed: Mar. 7, 2013

(86) PCT No.: PCT/CH2013/000039
§ 371 (c)(1),
(2) Date: Sep. 2, 2014

(87) PCT Pub. No.: WO2013/131202
PCT Pub. Date: Sep. 12, 2013

(65) Prior Publication Data
US 2015/0096289 A1 Apr. 9, 2015

(30) Foreign Application Priority Data

Mar. 7, 2012 (CH) .......................................... 310/12

(51) Int. Cl.
*F16D 31/02* (2006.01)
*F02C 6/16* (2006.01)
(Continued)

(52) U.S. Cl.
CPC .................. *F02C 6/16* (2013.01); *F02C 1/05* (2013.01); *F02C 6/14* (2013.01); *F15B 1/024* (2013.01); *F28D 20/00* (2013.01); *F28D 20/0056* (2013.01); *F17C 2221/031* (2013.01); *F17C 2223/0123* (2013.01);
(Continued)

(58) Field of Classification Search
CPC .................................. F15B 1/024; Y02E 60/15
See application file for complete search history.

(56) References Cited

U.S. PATENT DOCUMENTS 4,108,077 A * 8/1978 Laing ..................... B61B 13/10
104/154
8,572,972 B2 * 11/2013 Frey ......................... F01K 3/02
60/641.14
(Continued)

FOREIGN PATENT DOCUMENTS

WO WO-2011053411 A1 5/2011

OTHER PUBLICATIONS

Klados, Iason, "International Search Report," prepared for PCT/CH2013/000039, as mailed Jun. 18, 2013, three pages.

*Primary Examiner* — Michael Leslie
(74) *Attorney, Agent, or Firm* — Winstead PC

(57) ABSTRACT

The invention relates to a compressed air energy storage system comprising a pressure accumulator (2) for gas to be stored under pressure, and a heat accumulator (27) for storing the compression heat that has accumulated during charging of the pressure accumulator (2), wherein the heat accumulator (27) is arranged ready for use in an overpressure zone (31). Said arrangement enables a structurally simple heat accumulator to be provided, since said heat accumulator is not loaded by the pressure of the gas passing therethrough.

13 Claims, 5 Drawing Sheets

(51) Int. Cl.
- *F15B 1/02* (2006.01)
- *F02C 6/14* (2006.01)
- *F28D 20/00* (2006.01)
- *F02C 1/05* (2006.01)

(52) U.S. Cl.
CPC .. *F17C 2223/035* (2013.01); *F17C 2260/046* (2013.01); *F17C 2270/0149* (2013.01); *F17C 2270/0581* (2013.01); *F28D 2020/0082* (2013.01); *Y02E 60/142* (2013.01); *Y02E 60/15* (2013.01)

(56) References Cited

U.S. PATENT DOCUMENTS

| | | |
|---|---|---|
| 2011/0094231 A1 | 4/2011 | Freund |
| 2011/0094236 A1 | 4/2011 | Finkenrath et al. |
| 2011/0127004 A1 | 6/2011 | Freund et al. |
| 2012/0012276 A1* | 1/2012 | Von Herzen ............. F24J 3/086 165/45 |

* cited by examiner

PRESSURISED ENERGY STORAGE SYSTEM IN WHICH THE HEAT ACCUMULATOR IS ARRANGED IN AN OVERPRESSURE ZONE

The present invention relates to a pressurized energy storage system according to the preamble of claim 1. Pressurized energy storage systems of the mentioned kind are used to store energy similarly to a pumped storage hydro power station: Energy is stored during low load periods, and made available again during times of high energy demand.

Energy storage has been established in conventional energy production. It is now also increasingly being required for alternative energy production, whether it be solar energy or wind energy, for example, which is determined by the local weather conditions at the location of a power station, and thus difficult if not impossible to tailor to the current energy demand in the connected network. Expanding the pumped storage hydro power stations existing in numerous locations is contingent on a corresponding geography (mountains) being present, but even there is encountering increased political resistance, since the construction of larger storage basins is often greeted with a critical assessment from the standpoint of landscape protection.

Therefore, the demand for possible ways of storing energy is increasing not just in alternative energy generation given the difficulty or impossibility of planning energy production, but also in conventional energy generation.

Energy generated during low load periods is used in pressurized energy storage systems for compressing gas, predominantly ambient air (the term "air" is used in describing the invention below, even though a wide variety of gases could of course be used according to the invention), after which the pressurized gas is stored in a pressure accumulator. The energy stored in the compressed gas via its pressure can be reused by removing compressed gas from the accumulator and using it to drive an expansion turbine, which for its part drives a generator, for example. This concept is known as CAES, i.e., compressed air energy storage. Such plants are also tied to geological preconditions that are favorable in mountainous regions. But flat terrain often also has geological formations that permit the installation of larger pressure accumulators underground. As a result, pressurized energy storage systems can be realized in many locations by comparison to pumped storage hydro power stations, for example.

Compressing air for purposes of storing compressed air causes the latter to heat up, so that a considerable percentage of the compression work takes the form of heat (up to 70% of all energy applied by the compressor). This heat is stored in a heat accumulator and recuperated by returning it to the air stored under a pressure during the reuse of this air before it enters into an expansion turbine (TES, i.e., thermal energy storage).

The process of compressing the air and depressurizing it for reusing the stored energy can basically take place in one or several stages. As a rule, a cavern under the ground or in a mountain serves as the pressure accumulator. This opens the door to storing very large amounts of energy, since caverns, for example in halite or other geological formations, can exhibit a volume of several hundred thousand up to a million or more cubic meters.

As of this writing, two pressurized energy storage systems are operational, the Huntdorf power station in Germany and the McIntosh power station in the U.S. McIntosh was commissioned in 1991, stores air in a 538,000 m³ underground cavern designed as a pressure accumulator, and is able to provide 110 MW for 26 hours. Additional pressurized energy storage systems are being planned, for example the Strassfurt power station.

Various technical problems are encountered in the realization of such power stations.

For example, US 2011/0094231 discloses a circuit arrangement of the multistage compressor and turbine array with several heat accumulators (TES) for a pressure of 60 bar in the pressure accumulator. The compressors and turbines are here connected with the heat accumulators in such a way that the peak temperature in the heat accumulators only negligibly exceeds a temperature of 300° C. instead of the 650° C. to be expected given a conventional circuit. As a result, significant structural problems are avoided during the construction of a plant suitable for operating temperatures in excess of 350° C. (in particular the heat accumulator). In addition, this is intended to increase the efficiency during the individual compressor or turbine stages.

US 2011/01127004 shows the construction of a heat accumulator for a circuit arrangement of the compressor that yields a temperature of 600° C. and a pressure of up to 60 to 80 bar in the air to be stored. However, this configuration remains structurally complex, since the heat accumulator does reduce, but must still always be resistant to compression by a considerable internal pressure during operation. In particular for large pressure accumulators (and hence for the storage of large quantities of heat), the disclosed structural design is not optimal, and remains far too complex for commercial realization.

Accordingly, the object of the present invention is to create a structurally simple pressurized energy storage system, which makes it possible to store heat at a high temperature, preferably in excess of 500°.

This object is achieved by a pressurized energy storage system according to the characterizing features in claim 1, and according to the characterizing features in claim 12.

Because the heat accumulator is for its part operatively located in an overpressure zone, it can be designed for operation without any notable difference in pressure between the compressed air flowing through it and the ambient pressure acting upon it, i.e., given a significantly simpler and more cost-effective structural design. In pressurized energy storage systems, a quasi potential overpressure zone is available at the location of the pressure accumulator, so that its establishment for the heat accumulator is structurally exceedingly simple in terms of the present invention. This largely eliminates the significant problems encountered to this day with regard to the construction and realization of the heat accumulator during the planning of pressurized energy storage systems.

In a preferred embodiment of the heat exchanger with a dry filling comprised of heat-storing loose material that has inclined lateral walls, the expansion pressure of the loose pressure can be lowered while heating it in excess of 600° C., for example, to such an extent that the heat accumulator can be easily manufactured with conventional means. If the inclined lateral walls are for their part supported by a filling of stabilizing loose material in another embodiment, they need only be dimensioned to an internal pressure prevailing in the heat accumulator (expansion pressure of the loose material) for safety purposes.

Because the pressure in the overpressure zone is kept at the level of the compressed gas while loading the pressure accumulator and at the level of the removed gas while removing stored compressed gas in the method according to the invention, the heat accumulator can be used for various operating pressures in the air flowing through it without exposure to the corresponding internal pressure, and hence be optimally connected with the respective compressor and expansion stages of a specific pressurized energy storage system.

The invention will be explained in more detail based on the figures:

Shown on:

Figure 1:
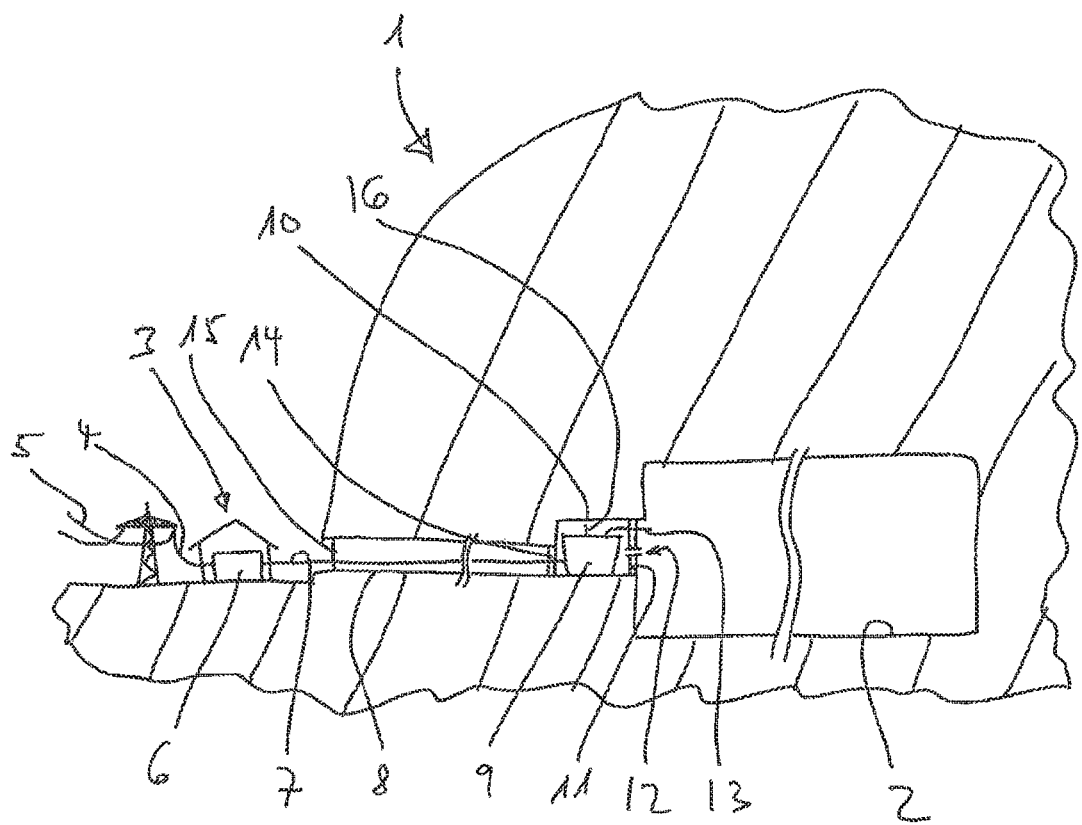
FIG. 1 is a schematic cross section through a massif with the heat accumulator arranged in accordance with the invention.

FIG. 1 shows a cross section through a rock 1 with a cavern designed as a pressure accumulator 2 set up therein for gas stored under a pressure, in this case air. Also visible is a powerhouse 3 connected by a power line 4 with a power grid 5. Present in the powerhouse 3 is a compressor and turbine array 6 only schematically depicted on the figure. Compressed air lines 7 lead from there through an access gallery 8 and to a heat accumulator 9, which is situated in a separate room 10 of the cavern or pressure accumulator 2. According to the invention, the room 10 can be exposed to a pressure with the pressurized energy storage system operational, thereby forming an overpressure zone next to the pressure accumulator 2.

The cavern for the pressure accumulator 2 can lie in any suitable geological formation, such as in a massif or underground in the lowlands, and also consist of a decommissioned railway tunnel, for example. In the case of a tunnel, it is especially easy to set aside a section of tunnel as the overpressure zone.

In the embodiment shown, the room 10 of the heat accumulator 9 is separated from the pressure accumulator 2 by a partition wall 11 (but could also be provided remotely from the latter at another suitable location), wherein the partition wall 11 incorporates a switchable or sealable connection 12, which can be used to equalize the pressure between the pressure accumulator 2 and overpressure zone, i.e., the room 10 in this case. A compressed air line 13 further runs through the partition wall 11 from the heat accumulator 9 into the pressure accumulator 2. Also provided is a line 16 through which cooled compressed air introduced into the heat accumulator via the lines 7 can get directly into the room 10.

The room 10 is here separated from the outside world in a pressure-tight manner by an outer partition wall 14. Finally, a gate 15 can also be provided to seal the access gallery 8.

In other words, FIG. 1 shows a pressurized energy storage system with a pressure accumulator for gas to be stored under a pressure, and with a heat accumulator for storing the compression heat that arose while loading the pressure accumulator, wherein the heat accumulator for its part is operatively situated in an overpressure zone.

This arrangement makes it possible to use the power grid 5 to drive the compressors in the compressor and turbine array 6, for example to adiabatically compress air and load this heated air into the heat accumulator 9, in which the supplied air is cooled to ambient temperature (20° C.), for example, and from which the cooled air gets into the pressure accumulator 2, until such time as the pressure accumulator 2 has been filled, i.e., has reached its maximum operating pressure, which here measures 80 to 100 bar. The compressors can here be operated so as to continuously compress the air in such a way that its pressure lies comparatively slightly above the current pressure in the pressure accumulator 2, meaning that the latter is being filled optimally.

In this way, energy can be stored during low load periods in the power grid. The energy is stored by the pressure of the stored air on the one hand, and by the heat stored in the heat accumulator 9 on the other.

While storing energy, air exposed to a considerable pressure flows through the heat accumulator 9, as mentioned above up until the maximum operating pressure in the pressure accumulator 2, in this case up to a range of 80 to 100 bar or more. If the heat accumulator 9 according to prior art were to be situated in a zone with a normal ambient pressure, it would have to be rated for an internal pressure in the mentioned magnitude, which would pose significant structural problems and in any event entail excessively high costs for commercial operation.

According to the invention, the heat accumulator 9 is now situated in a room 10 designed as an overpressure zone, wherein an overpressure is generated with the pressurized energy storage system operational that corresponds to the pressure of the compressed air flowing through the heat accumulator 9. The overpressure in the overpressure zone is easy to generate: It is enough to keep the switchable connection 11 between the pressure accumulator 2 and room 10 open while loading the pressure accumulator 2, thereby continuously equalizing the pressure between the room 10 and pressure accumulator 2. The small volume in the room 10 by comparison to the pressure accumulator 2 causes only a negligible pressure drop in the pressure accumulator 2 when opening the connection 11, and hence results in a negligible or likely only computationally relevant loss in stored energy.

In this regard, the invention also makes it possible to arrange the heat accumulator 9 in the pressure accumulator 2 by itself, i.e., to omit the partition wall, at least in a single-stage compressor and turbine array.

As a consequence, the overpressure zone is designed for a loading operating pressure that corresponds to a loading operating pressure in the pressure accumulator.

On the other hand, the connection 11 can also be kept closed, so as to thereby maintain an operating pressure in the room 10 independent of that in the pressure accumulator 2. For example, this can be done via the line, if yet another compression stage for the air to be stored is provided behind the heat accumulator 9 (see further below in this regard).

In general, it therefore holds true that the operating pressure in the room 10 can be set at any time to the level corresponding to the current pressure in the line 7, and hence in the heat accumulator 9. Compressed air for this purpose is available at any time from compressor operation, and can get into the room 10 not just from the pressure accumulator 2, but also via the line 16, as mentioned. To simplify the figure, the line 16 omits another line that links the room 10 with the outside world and can be used to reduce the pressure prevailing in the room 10 down to ambient pressure.

If the goal is now to recover stored energy, the air stored under pressure flows from the pressure accumulator 2 via the line 13 back to the heat accumulator 9, is there heated, and flows further back into the compressor and turbine array 6 through the line 7 as hot compressed air, where it drives a generator by way of the turbines that feeds current into the power grid 5 via the power supply line 4.

Figure 2:
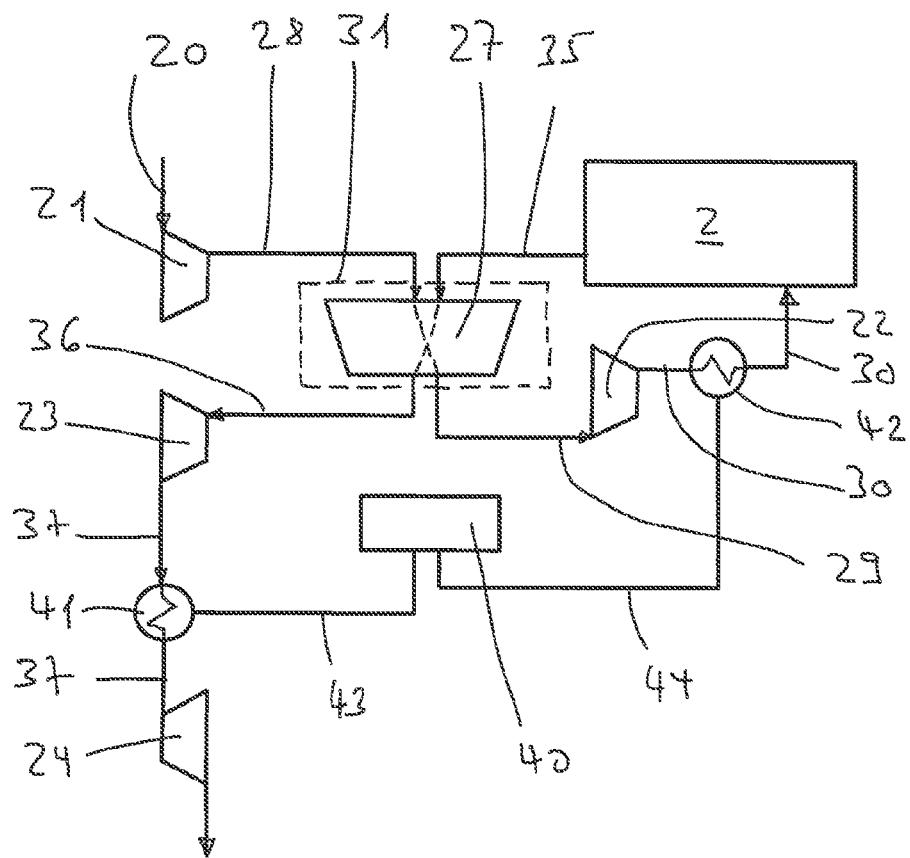
FIG. 2 is a diagram of a pressurized energy storage system with a secondary heat accumulator.

FIG. 2 shows a diagram depicting a preferred embodiment of the pressurized energy storage system, in which another compression stage is provided behind the heat accumulator 9, as mentioned above.

Depicted is a feed line 20 for air to be stored under a pressure, as well as a two-stage compressor array with a first compressor 21 and second compressor 22. Further depicted is a two-stage turbine array with a first turbine 23 and second turbine 24. The air removed from the pressure accumulator 2 is the released to the environment again via a discharge line 25.

A heat accumulator 27 is operatively connected between the first and second compressors 21, 22 by means of pressure lines 28, 29 leading to the pressure accumulator 2. The second compressor 22 is connected with the pressure accumulator 2 by another pressure line 30.

The heat accumulator 27 is in turn connected via lines 35, 36 leading away from the pressure accumulator between the pressure accumulator 2 and first turbine 23.

According to the invention, the heat accumulator 27 is located in an overpressure zone 31, for example in the room 10 on FIG. 1. To simplify the figure, the overpressure zone 31 is only denoted by dashed lines. The heat accumulator 27 is here designed in such a way that the respectively supplied compressed air can stream freely through it, which causes its internal pressure to correspond to the pressure of the air streaming through it, and eliminates the need for correspondingly expensive pressure lines for the air streaming through that complicate heat transfer. As mentioned above, the overpressure in the overpressure zone 31 is then set according to the invention so as to correspond to the current pressure level of the air streaming through the heat accumulator 27.

The first turbine 23 is connected with the second turbine 24 by a pressure line 37 leading away from the pressure accumulator 2.

Heat exchangers 41, 42 are used to operatively connect a secondary heat accumulator 40 with the line 37 on the one hand and with the line 30 on the other by way of a secondary circulation comprised of the lines 43, 44.

Figure 3:
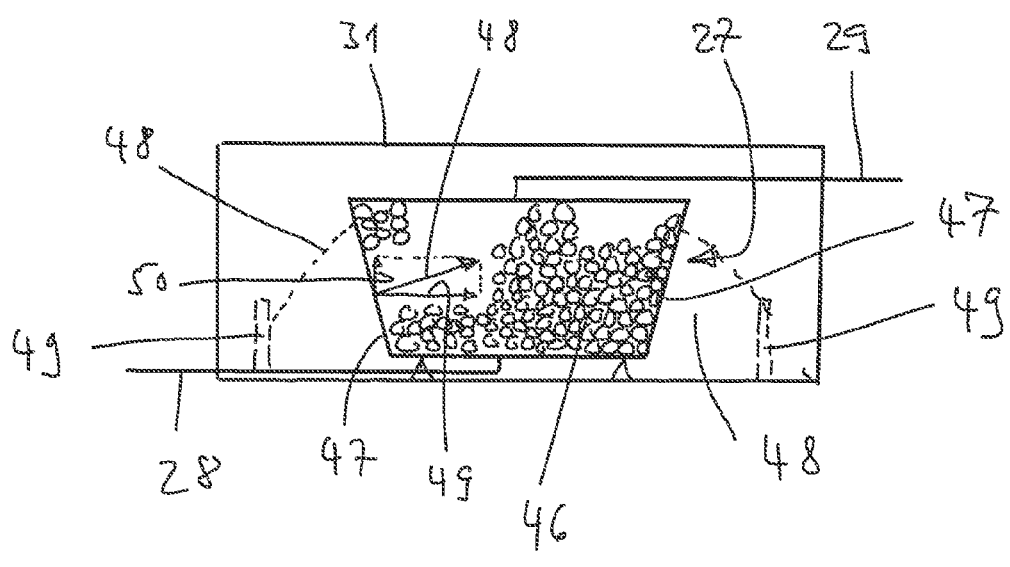
FIG. 3 is a schematic view of a preferred embodiment of a heat accumulator used according to the invention in an overpressure zone.

FIG. 3 provides a diagrammatic, cross sectional view depicting a preferred embodiment of a heat accumulator 27 located in the overpressure zone 31. To simplify the figure, only the lines 28, 29 (FIG. 2) are recorded here, while all other lines, etc., are omitted, for example the lines 35, 36 (FIG. 2) along with other lines, e.g., the line 16 (FIG. 1). It is here essential that the heat accumulator 27 exhibit a dry filling of loose material 46 through which heat-loaded, compressed air conveyed to the pressure accumulator 2 can stream, for example from the top down, thereby heating the loose material from the top down in layers. The loose material expands, thereby exerting pressure on the walls 47 of the heat accumulator 27. Since the walls 47 expand upwardly (like an inverted truncated cone) (i.e., the loose material container also expands upwardly), the counter-pressure (force vector 48) of the walls 47 on the loose material 46 is not horizontal, but rather somewhat upwardly directed, as a result of which its horizontal component 49 resists the expansion pressure of the loose material 47, and a vertical component 50 presses the loose material 47 upward to some extent. This causes portions of the loose material 46 to slide toward the top more easily, where the expansion of the heat accumulator 27 provides a bit more room for the shifting loose material 46, thereby decisively reducing the expansion pressure of the loose material 46 against the walls 47.

According to the invention, it turns out that no (or only negligible) pressure is exerted on the heat accumulator 27 by the compressed gas being conveyed through it, since the external pressure can be adjusted via the overpressure zone 31. In addition, it turns out that the compressive stress placed on the walls by the heat expansion is significantly reduced by comparison to the expansion pressure possible at the envisaged temperatures. For this reason, it is especially easy to design and manufacture a heat accumulator 27 exposed to a comparatively weak load in this way and having upwardly expanding walls.

In another embodiment only alluded to on the figure, the lateral wall of the heat accumulator is supported to the outside by an accumulation 48 of loose material (shown dashed), which is preferably compacted. Without the overpressure zone being filled as a result, this yields a significant support for the lateral walls, since accumulated and possibly compacted loose material can absorb high loads due to the inner wedging of the loose material particles. The accumulated material can further be supported to the outside by an external wall 49 (also only shown dashed). Due to the aforementioned inner wedging of loose material particles, the external wall 49 does not have to absorb any high loads, even given a significant expansion pressure of the loose material 46 in the heat accumulator 27.

This support provided by the accumulation 48 of external, supporting loose material leads to a further reduced capacity to withstand stress on the part of the lateral walls 47 of the heat accumulator 27. In particular, the lateral walls are then only subjected to a reduced tensile stress (in the circumferential direction) and predominantly to pressure (in a radial direction). Finally, this makes it possible to manufacture the lateral walls 47 out of concrete elements, making the heat accumulator 27 especially cost effective to fabricate.

It turns out that arranging the heat accumulator in an overpressure zone according to the invention is what even allows for providing heat accumulators with a simple design (i.e., including types of heat accumulators different from those shown on FIG. 3) at a high pressure for the gas transporting the heat. The entire set object preferably involves using a heat accumulator with a dry filling of loose material whose walls upwardly expand, and during operation thereby significantly diminish the thermal expansion pressure of the heat-storing loose material that become relevant for the design of the heat exchanger at high temperatures. A synergy exists between these concepts (overpressure zone and expanding walls).

Figure 4:
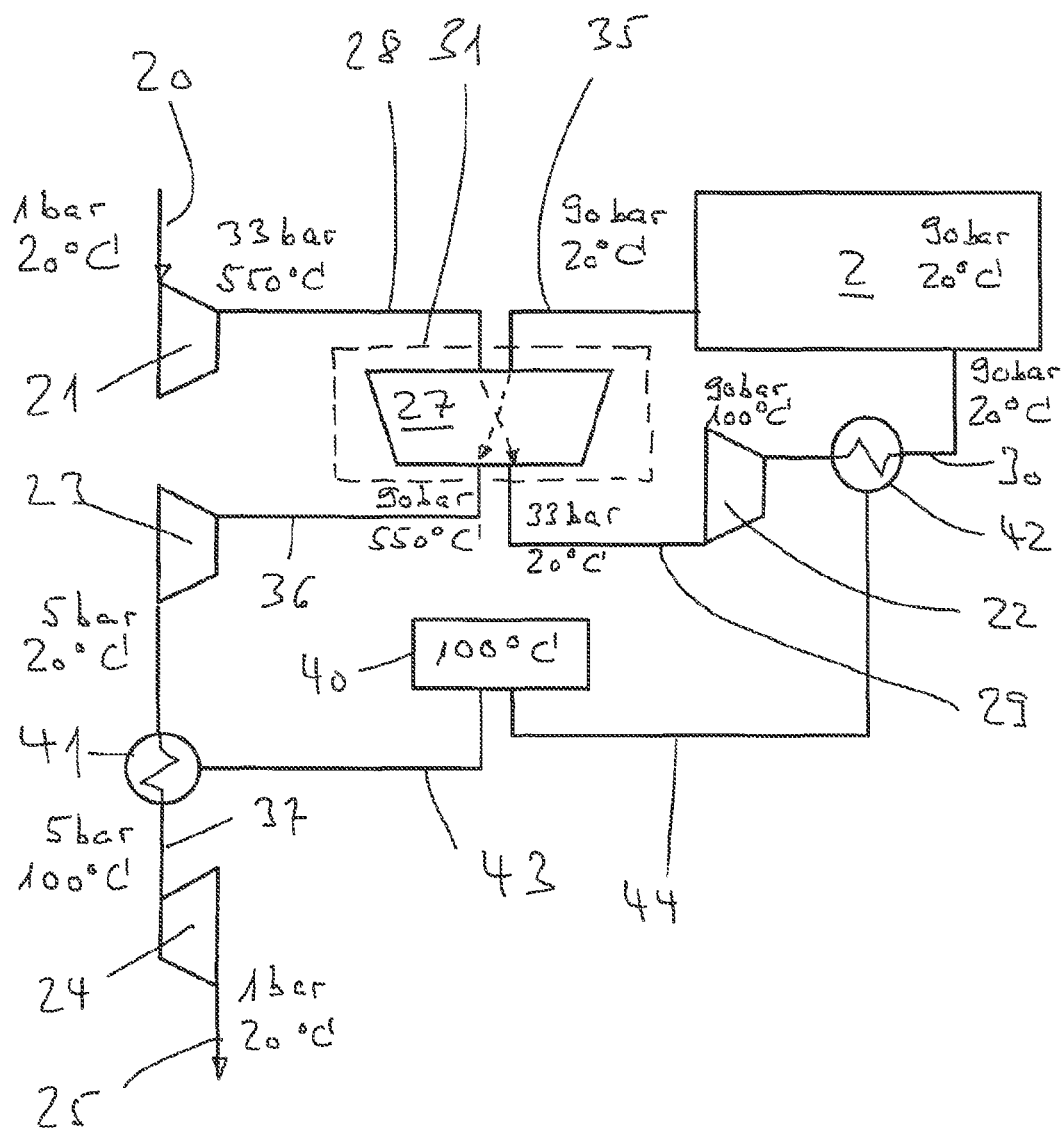
FIG. 4 is the diagram from FIG. 2 with values for pressure and temperature recorded for the respective components.

FIG. 4 presents the diagram from FIG. 2, wherein the pressure and temperature during operation of the depicted embodiment are directly recorded for the respective different components to more simply explain the correlations.

In order to store energy, the lines 35, 36 leading away from the pressure accumulator 2 are closed along with line 43, and the necessary other lines are opened. Ambient conditions prevail in the feed line 20, which here measure 1 bar/20° C. After the first compressor 21, 33 bar/550° C. prevail in the line leading to the heat accumulator 27. Accordingly, a pressure of 33 bar is set in the overpressure zone 31, so that the heat accumulator 27 is exposed to no (or only slight) compressive load. Given a pressure accumulator 2 that has already been largely filled, it turns out that a loading operating pressure smaller than a current pressure in the pressure accumulator 2 prevails in the overpressure zone 31.

While passing through the heat accumulator 27, the compressed gas cools, so that 33 bar/20° C. prevail in the line 29 leading to the second compressor 33. After the second compressor 22, the compressed gas is conveyed in the line 30 at 90 bar/100° C., and cooled to 20° C. while passing through the heat exchanger 42, so that the pressure accumulator 2 is loaded with air having 90 bar/20° C.

The heat abated by the heat exchanger 42 is stored via the secondary circulation in the line 44 in the secondary heat accumulator 40, which correspondingly has an upper operating temperature of 100° C. This makes it possible to here use water as the heat-storing material.

In order to extract energy, the lines 20, 28, 29, 30, 40 leading to the pressure accumulator 2 are closed, and the lines 35, 36, 37, 25 leading away from the pressure accumulator are opened, as is the line 43 lying between the secondary heat accumulator 40 and the heat exchanger 41.

90 bar/20° C. prevail in the line 35 leading out of the pressure accumulator 2, while 90 bar/550° C. is present in the line 36 after passage through the heat accumulator 27. Let it here be noted that the overpressure in the overpressure zone 31 is easily established in this phase of operation via pressure equalization between the pressure accumulator 2 and overpressure zone 31' (e.g., via a connectable line 12, see FIG. 1).

The pressure and temperature drop down to 5 bar/20° by way of the first turbine 23, with 5 bar/100° C. being present in the line 37 after the heat exchanger 41, which is reduced down to the ambient values of 1 bar/20° C. after the turbine 24. The heat exchanger 41 is supplied with heat from the secondary heat accumulator 40 via the secondary circulation in the line 43.

The values indicated above are calculated values for suitably designed components in a phase, in which the pressure accumulator 2 is maximally charged, and in which a switch is made from storing energy to recovery. Assisted by the present specification, the expert can easily establish the operating parameters for each operating state of the pressurized energy storage system. In addition, the expert can easily establish a circuit arrangement for the compressor and turbine array for a specific power station, and in the process also determine the values applicable for the overpressure zone 31.

Figure 5:
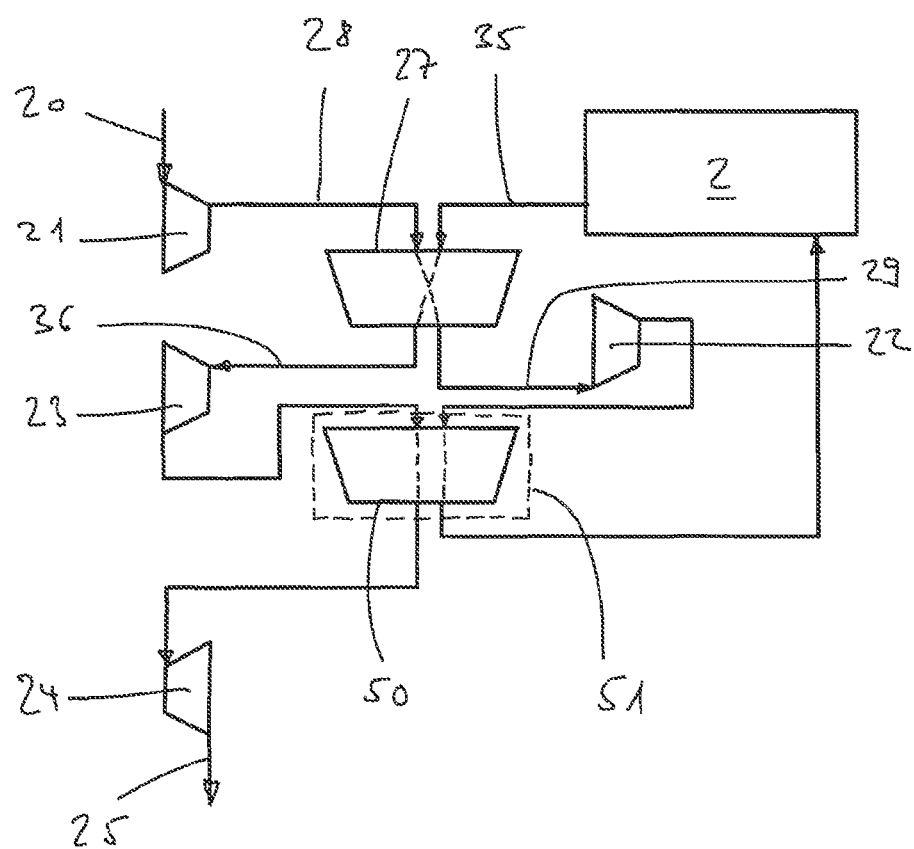
FIG. 5 is the diagram from FIG. 2, but involving the use of a modified secondary heat accumulator.

FIG. 5 shows the arrangement according to FIGS. 2 and 4, but also provides for a secondary heat accumulator 50, which is located in a secondary overpressure zone 51. This makes it easy to also store temperatures in excess of 100° C. in the secondary heat accumulator, which may be desirable depending on the specific configuration of a pressurized energy storage system. The design of the secondary overpressure zone 51 can be readily conceived by the expert analogously to the design of the room 10 (FIG. 1).

Based on a specific embodiment of the pressurized energy storage system, it is understood that mutually corresponding pressure levels, e.g., the pressure in the overpressure zone and pressure of the compressed gas flowing through the heat accumulator need not be identical, but rather can vary within the framework of a tolerance. In like manner, a certain pressure difference may for some reason be desirable (e.g., flow resistances downstream) or acceptable. Even then, the invention makes it possible to easily build the heat accumulator, since it need not be rated for the large pressure difference between the operating pressure of the compressed gas flowing through and the external pressure, but rather for only a fraction of this pressure difference.

The invention claimed is:

1. A pressurized energy storage system comprising:
a pressure accumulator having a constant volume for gas to be stored under a pressure; and
a heat accumulator disposed in a room, the heat accumulator being smaller than the room and being adapted to be pressurized by a gas present in the room, the pressurized gas forming an overpressure zone around the heat accumulator, wherein gas to be stored in the pressure accumulator is flowing through the heat accumulator before entering the pressure accumulator, the heat accumulator storing heat of compression while charging the pressure accumulator.

2. The pressurized energy storage system according to claim 1, wherein the overpressure zone can be exposed to a loading operating pressure that corresponds to a loading operating pressure in the pressure accumulator.

3. The pressurized energy storage system according to claim 1, wherein a switchable connection is provided between the overpressure zone and pressure accumulator to equalize the pressure between the overpressure zone and pressure accumulator.

4. The pressurized energy storage system according to claim 1, wherein the overpressure zone can be exposed to a loading operating pressure smaller than the current pressure in the pressure accumulator.

5. The pressurized energy storage system according to claim 1, wherein the heat accumulator exhibits a dry filling of loose material and a lateral wall enveloping the loose material, which is inclined at an angle of inclination relative to vertical in such a way that a loose material container upwardly expands.

6. The pressurized energy storage system according to claim 1, wherein the heat accumulator exhibits a filling of loose material and a lateral wall enveloping the filling of loose material, and wherein the lateral wall is supported to the outside against a supporting loose material for absorbing the operating pressure of the heat-storing loose material.

7. The pressurized energy storage system according to claim 1 comprising:
a compressor array;
a turbine array;
an arrangement of connecting lines; and
wherein the compressor array can be operatively connected by way of the heat accumulator with the pressure accumulator via the connecting lines for storing compressed gas, or the pressure accumulator can be operatively connected by way of the heat accumulator with the turbine array via other connecting lines for recuperating stored heat.

8. The pressurized energy storage system according to claim 7, wherein the arrangement of connecting lines exhibits a pressure equalization line, which can be switched between the overpressure zone and pressure accumulator for operating the pressure accumulator at the same pressure level, and interrupted between the pressure accumulator for operating at a different pressure level.

9. The pressurized energy storage system according to claim 7, wherein the turbine array has a multistage design, and a secondary heat accumulator is provided in a secondary overpressure zone, which is operatively connected with the last stage of the turbine array in such a way that the turbine array can be operated with heat recuperated from the secondary heat accumulator.

10. The pressurized energy storage system according to claim 7, wherein the compressor array has a multistage design, and a secondary heat accumulator is provided in a secondary overpressure zone, which is operatively connected with the last compressor stage in such a way that the heat of compression generated by its compression can be stored in the secondary heat accumulator.

11. The pressurized energy storage system according to claim 1, wherein a secondary heat accumulator is provided that exhibits water as a heat-storing medium.

12. A method for storing energy in the form of gas stored under a pressure in a pressure accumulator having a constant volume, the method comprising:

compressing the gas to be stored and feeding the gas into the pressure accumulator;

storing heat accrued while compressing the gas in a heat accumulator, and returned to the gas after storage when the gas is fed out of the pressure accumulator for recovering the stored gas;

locating the heat accumulator in an overpressure zone, the heat accumulator being smaller than the overpressure zone and the overpressure in the overpressure zone is generated by a gas; and adjusting the overpressure in the overpressure zone to a current and variable operating pressure level of the compressed gas flowing through the heat accumulator while charging the pressure accumulator, and to the current and variable operating pressure level of the gas flowing through the heat accumulator and being removed from the pressure accumulator while removing stored compressed gas.

13. The method according to claim 12, wherein the gas is compressed for storage and the stored gas is depressurized for energy recovery in multiple stages, and wherein a secondary heat accumulator is provided in a secondary overpressure zone, which after the gas has been compressed absorbs heat from it after the last compression stage, stores the heat until the stored gas is reused, and releases it to the gas again during reuse, wherein the secondary overpressure zone is kept at the current pressure level of the gas flowing through it.

* * * * *